US011942240B2

(12) United States Patent
Egami

(10) Patent No.: US 11,942,240 B2
(45) Date of Patent: *Mar. 26, 2024

(54) DISTRIBUTION MEMBER AND METHOD OF MANUFACTURING THE SAME

(71) Applicant: Hitachi Metals, Ltd., Tokyo (JP)

(72) Inventor: Kenichi Egami, Tokyo (JP)

(73) Assignee: Proterial, Ltd., Tokyo (JP)

( * ) Notice: Subject to any disclaimer, the term of this patent is extended or adjusted under 35 U.S.C. 154(b) by 32 days.

This patent is subject to a terminal disclaimer.

(21) Appl. No.: 17/519,206

(22) Filed: Nov. 4, 2021

(65) Prior Publication Data

US 2022/0059252 A1    Feb. 24, 2022

Related U.S. Application Data

(63) Continuation of application No. 17/070,019, filed on Oct. 14, 2020, now Pat. No. 11,189,395, which is a
(Continued)

(30) Foreign Application Priority Data

May 31, 2017    (JP) ................................. 2017-108504

(51) Int. Cl.
  *H01B 7/00*    (2006.01)
  *H01B 7/40*    (2006.01)
  (Continued)

(52) U.S. Cl.
  CPC ............ *H01B 7/0045* (2013.01); *H01B 7/40* (2013.01); *H01B 13/01209* (2013.01);
  (Continued)

(58) Field of Classification Search
  CPC .. H01B 7/0045; H01B 7/40; H01B 13/01209; B60R 16/0207; B60R 16/0215
  See application file for complete search history.

(56) References Cited

U.S. PATENT DOCUMENTS 10,279,756 B2    5/2019  Hayakawa
2005/0217888 A1*  10/2005  Arai ..................... H02G 3/0418
                                                174/72 A
(Continued)

FOREIGN PATENT DOCUMENTS

CN    1046415 A    10/1990
JP    6-223645    8/1994
(Continued)

OTHER PUBLICATIONS

Notification of Reason(s) for Refusal dated Mar. 12, 2019 received from the Japanese Patent Office in related application 2017-108504.
(Continued)

*Primary Examiner* — Hoa C Nguyen
*Assistant Examiner* — Amol H Patel
(74) *Attorney, Agent, or Firm* — Scully, Scott, Murphy & Presser, PC

(57) ABSTRACT

A distribution member includes plural electric wire pairs each including a pair of electric wires, a first fixing member integrally fixing the electric wire pairs, and a second fixing member that is separated from the first fixing member and integrally fixes electric wires of at least one of the electric wire pairs. The first fixing member and the second fixing member each include a holder holding the electric wires and a resin mold part that includes a molding resin and is molded so as to cover a part of the electric wire pairs held by the holder. The holder includes at least one interposed part that is interposed between the held electric wires. The distribution member further includes a combining part that is integrally formed with the holders of the first and second fixing members and combines the holders of the first and second fixing members.

6 Claims, 12 Drawing Sheets

Related U.S. Application Data continuation of application No. 16/742,155, filed on Jan. 14, 2020, now Pat. No. 10,832,831, which is a continuation of application No. 15/979,696, filed on May 15, 2018, now Pat. No. 10,580,550.

(51) Int. Cl.
*H01B 13/012* (2006.01)
*H01B 17/60* (2006.01)
*H01R 43/24* (2006.01)
*H02K 3/38* (2006.01)
*H02K 3/50* (2006.01)

(52) U.S. Cl.
CPC ............ *H01B 17/60* (2013.01); *H01R 43/24* (2013.01); *H02K 3/50* (2013.01)

(56) References Cited

U.S. PATENT DOCUMENTS

| | | | |
|---|---|---|---|
| 2006/0065818 A1 | 3/2006 | Shimokawa et al. | |
| 2015/0096802 A1* | 4/2015 | Itani | B60R 16/0215 174/72 A |
| 2016/0362074 A1 | 12/2016 | Yamaguchi | |
| 2018/0174704 A1 | 6/2018 | Sugino | |
| 2018/0175596 A1 | 6/2018 | Sugino | |
| 2019/0217792 A1* | 7/2019 | Kawaguchi | H01B 7/00 |
| 2019/0273367 A1* | 9/2019 | Shimizu | H02G 3/0468 |

FOREIGN PATENT DOCUMENTS

| | | | |
|---|---|---|---|
| JP | 2006-12744 A | | 1/2006 |
| JP | 2006012744 A | * | 1/2006 |
| JP | 2006-126175 A | | 5/2006 |
| JP | 2009-004295 A | | 1/2009 |
| JP | 2011-259654 A | | 12/2011 |
| JP | 2017-7307 A | | 1/2017 |

OTHER PUBLICATIONS

Notice of Allowance dated Oct. 24, 2019 from parent U.S. Appl. No. 15/979,696.

Office Action dated Mar. 26, 2020 from parent U.S. Appl. No. 16/742,155.

Notice of Allowance dated Jul. 13, 2020 from parent U.S. Appl. No. 16/742,155.

Notification of First Office Action dated Dec. 2, 2020 received from the State Intellectual Property Office of The People's Republic of China in related application CN 201810482537.4 together with English language translation.

Notification of Reasons For Refusal dated Jul. 15, 2021 received from the Japanese Patent Office in related application JP 2020-152085 together with English language translation.

Notice of Allowance dated Jul. 30, 2021 from parent U.S. Appl. No. 17/070,019.

Notification of Reasons for Refusal dated Jan. 31, 2023 received from the Japanese Patent Office in related JP 2022-026526 together with English language translation.

Chinese Official Action dated Sep. 26, 2023, received from the China National Intellectual Property Administration in related application CN 202111050848.1, together with an English language translation.

* cited by examiner

*FIG.10A* *FIG.10B*
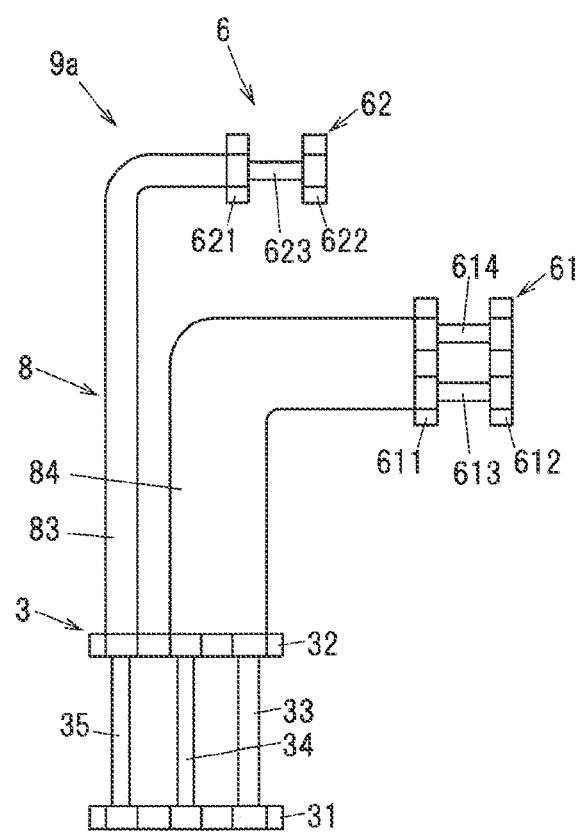
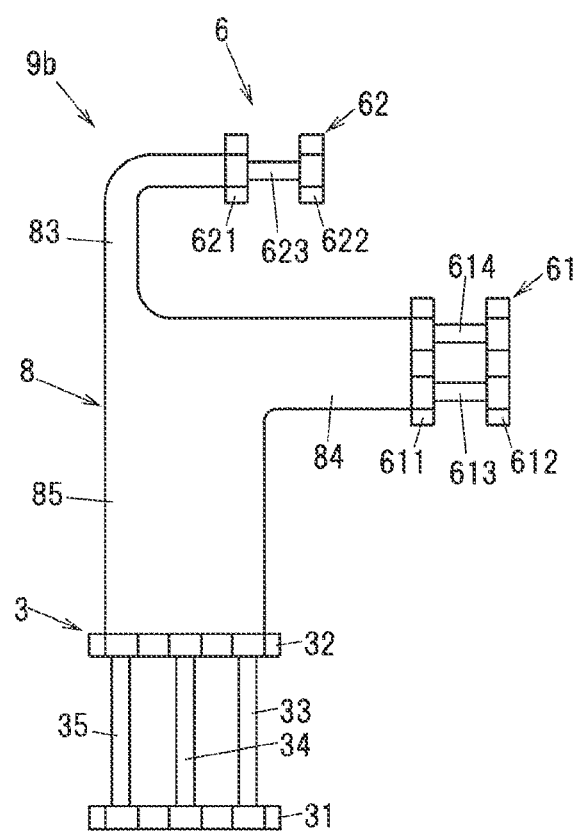

DISTRIBUTION MEMBER AND METHOD OF MANUFACTURING THE SAME

The present application is a continuation application of U.S. Ser. No. 17/070,019 filed on Oct. 14, 2020, U.S. Ser. No. 16/742,155 filed on Jan. 14, 2020, now U.S. Pat. No. 10,832,831 granted on Nov. 10, 2020 and U.S. Ser. No. 15/979,696 filed on May 15, 2018, now U.S. Pat. No. 10,580,550 granted on Mar. 3, 2020 and is based on Japanese patent application 2017-108504 filed on May 31, 2017, the entire contents of each of which are incorporated herein by reference.

BACKGROUND OF THE INVENTION

1. Field of the Invention

This invention relates to a distribution member with plural electric wires and a method of manufacturing the distribution member.

2. Description of the Related Art

A distribution member with plural electric wires is known which is used for electrical connection between connected objects (see e.g., JP 2011/259654 A).

The distribution member disclosed in JP 2011/259654 A is provided with three electric wires (power lines) for the connection between a three phase motor and a terminal block as connected objects. A terminal is crimped at one end each of the three electric wires and connected to the terminal block. The other end of each of the three electric wires is connected to a welding part of the three phase motor by welding.

JP 2011/259654 A discloses the second embodiment that three electric wires are combined together by a fixing member. The fixing member is rod-shaped and configured to insert a part of each of the three electric wires. The three electric wires are integrally arranged by the fixing member.

SUMMARY OF THE INVENTION

According to the current carrying capacity of the distribution member or the structure of the connected objects, the distribution member may be configured to have plural electric wire pairs in which two electric wires paired are arranged in parallel. In integrally combining the plural electric wire pairs by a combining part, the combining part may be formed by molding.

If the combining part is formed by molding, it may be necessary to fill a gap between the two electric wires by sandwiching each pair of electric wires by a pair of sliding molds so as to prevent a molding resin injected in the mold from leaking from the gap between two electric wires.

FIGS. 12A and 12B are comparative explanatory drawings showing a constructive example of a sliding mold for forming the abovementioned combining part by molding, wherein first to third electric wire pairs 91 to 93 are sandwiched by a pair of sliding molds 94 and 95. FIG. 12A shows a state that the first to third electric wire pairs 91 to 93 are sandwiched by the pair of sliding molds 94 and 95. FIG. 12B shows a state that the first to third electric wire pairs 91 to 93 are released from the pair of the sliding molds 94 and 95. The first electric wire pair 91 is composed of two electric wires 911 and 912. The second electric wire pair 92 is composed of two electric wires 921 and 922. The third electric wire pair 93 is composed of two electric wires 931 and 932.

In this case, it is necessary to ensure a space for moving the sliding molds 94 and 95 between the first electric wire pair 91 and the second electric wire pair 92, and between the second electric wire pair 92 and the third electric wire pair 93. This may prevent downsizing of the distribution member.

It is an object in some embodiments to provide a distribution member that can be downsized while forming a first fixing member for integrally fixing the plural electric wires by molding, as well as a method of manufacturing the distribution member.

According to an embodiment of the invention, a distribution member comprises:

a plurality of electric wire pairs each comprising a pair of electric wires;

a first fixing member integrally fixing the plurality of electric wire pairs; and a second fixing member that is separated from the first fixing member and integrally fixes the electric wires of at least one electric wire pair of the plurality of electric wire pairs, wherein the first fixing member and the second fixing member each comprise a holder holding the electric wires and a resin mold part that comprises a molding resin and is molded so as to cover a part of the electric wire pairs held by the holder, wherein the holder comprises at least one interposed part that is interposed between the held electric wires, and wherein the distribution member further comprises a combining part that is integrally formed with the holder of the first fixing member and the holder of the second fixing member and combines the holder of the first fixing member and the holder of the second fixing member.

According to another embodiment of the invention, a method of manufacturing a distribution member that comprises a plurality of electric wire pairs each comprising a pair of electric wires, a first fixing member integrally fixing the plurality of electric wire pairs, and a second fixing member that is separated from the first fixing member and integrally fixes the electric wires of at least one electric wire pair of the plurality of electric wire pairs, the method comprising:

providing a holder unit comprising holders of the first fixing member and the second fixing member that hold the electric wire and comprise at least one interposed part that is interposed between the held electric wires and a combining part that combines the holders of the first fixing member and the second fixing member and is integrally formed with the holders of the first fixing member and the second fixing member;

arranging the holder unit in a mold such that a plurality of the interposed parts are interposed between the electric wires; and forming the first fixing member and the second fixing member such that a resin mold part is molded so as to cover a part of the electric wire pairs held by the holders by injecting a melted molding resin into the mold.

Effects of the Invention

According to an embodiment of the invention, a distribution member can be provided that can be downsized with the gap between the electric wire pairs narrowed while forming a combining part for integrally combining the plural electric wire pairs by molding, as well as a method of manufacturing the distribution member.

BRIEF DESCRIPTION OF THE DRAWINGS

Next, the present invention will be explained in conjunction with appended drawings, wherein:

FIG. 10A is a plan view showing a variation of the holder unit;

FIG. 10B is a plan view showing a variation of the holder unit;

DETAILED DESCRIPTION OF THE PREFERRED EMBODIMENTS

Embodiment

Next, an embodiment according to the invention will be described with the accompanying drawings.

(Overall Structure of a Distribution Member)

Figure 1:
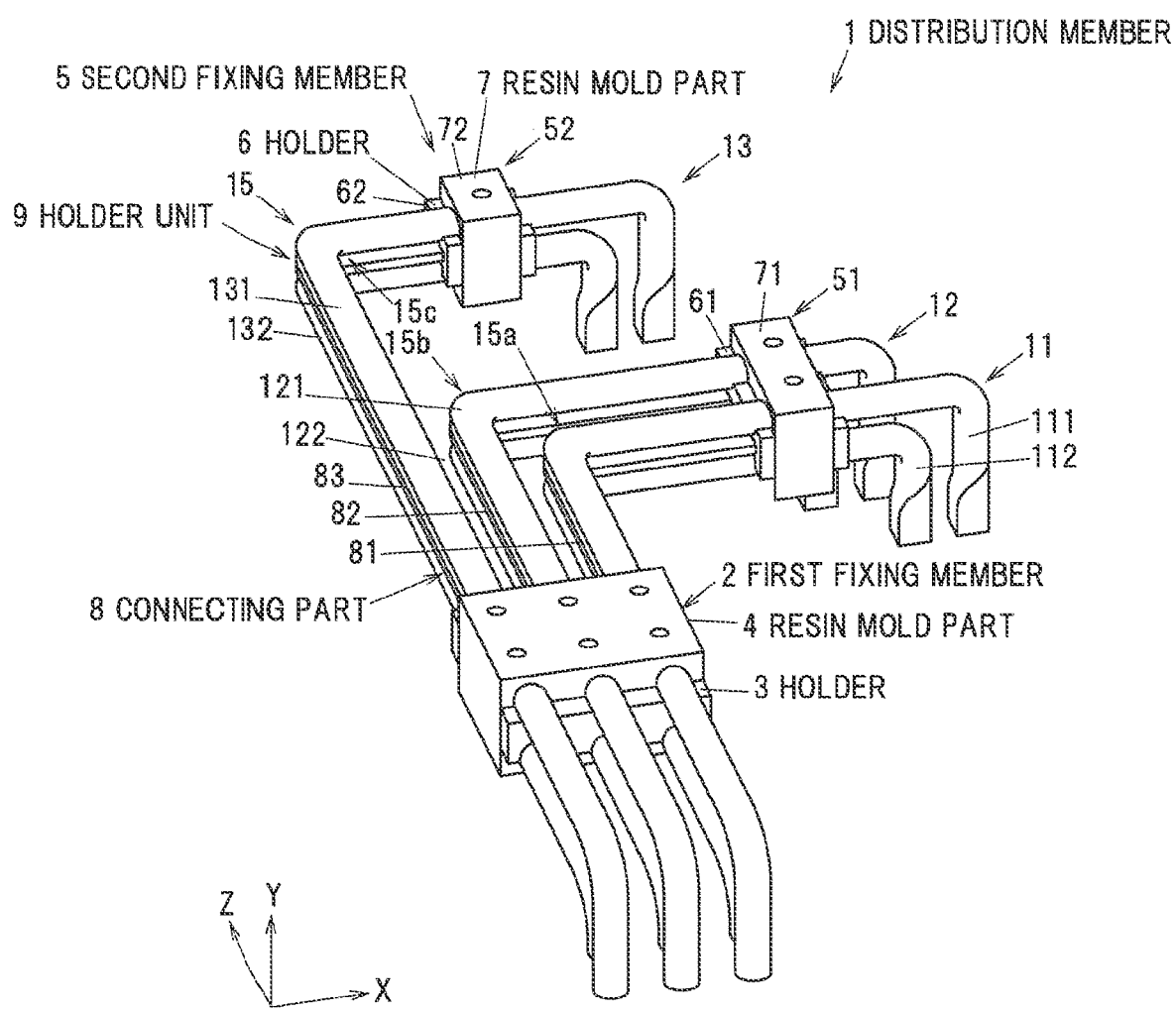
FIG. 1 is a perspective view showing a distribution member according to the embodiment in the invention.
Figure 2:
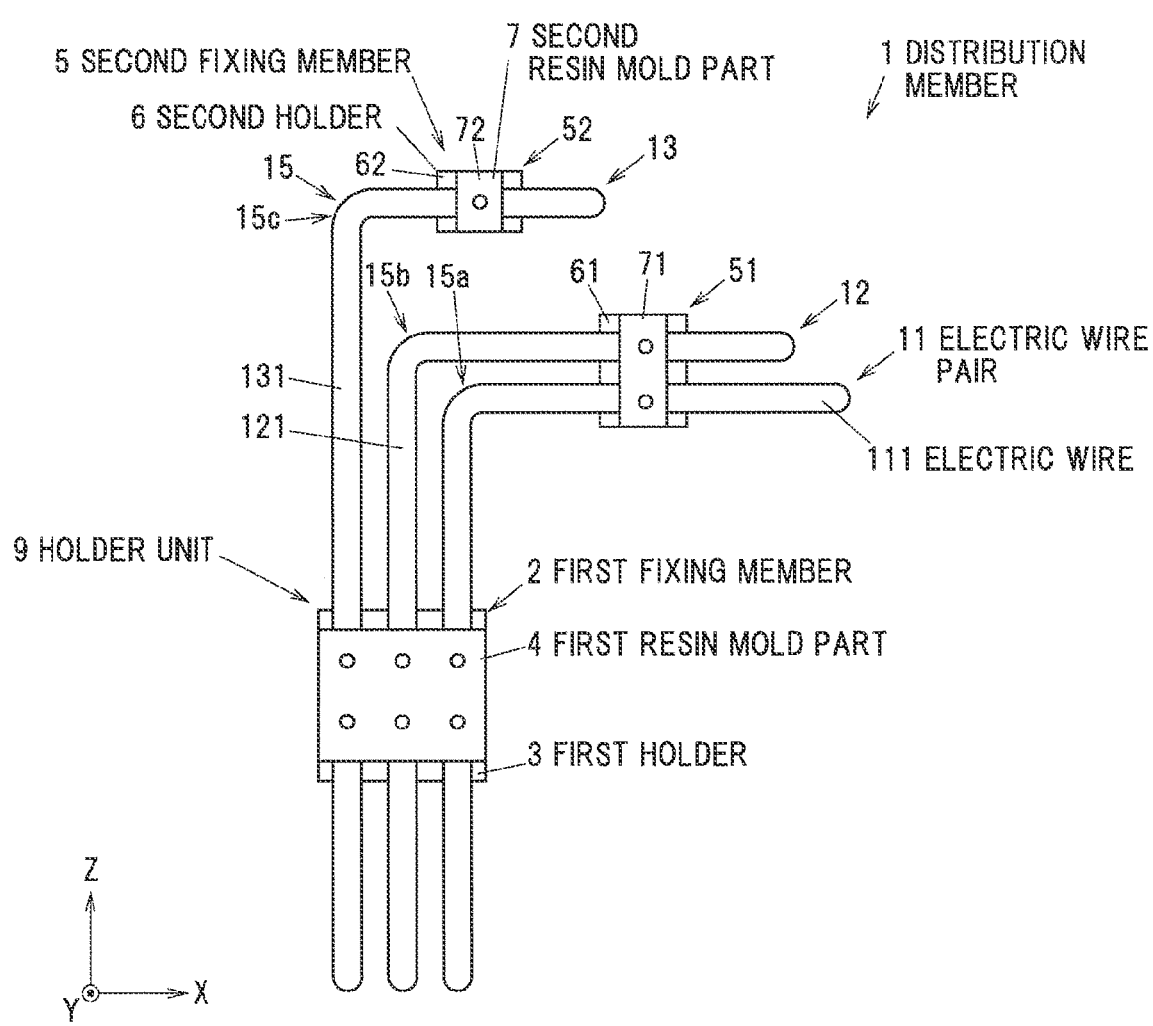
FIG. 2 is a plan view showing the distribution member shown in FIG. 1.

FIG. 1 is a perspective view showing a distribution member according to the embodiment in the invention. FIG. 2 is a plan view showing the distribution member shown in FIG. 1. The distribution member 1 is provided with a plurality of electric wire pairs 11 to 13 respectively provided with a pair of electric wires 111 and 112, 121 and 122, and 131 and 132. Also, the distribution member 1 is provided with a first fixing member 1 for integrally fixing a plurality of electric wire pairs 11 to 13, and a second fixing member 5 for integrally fixing at least one pair of the electric wire pairs from the plurality of electric wire pairs 11 to 13, which is provided with separated from a first fixing member 2. In the embodiment, the electric wires 111, 112, 121, 122, 131, and 132 are circular sectional enameled wires of which enameled coating is formed around conductive wires.

Figure 3:
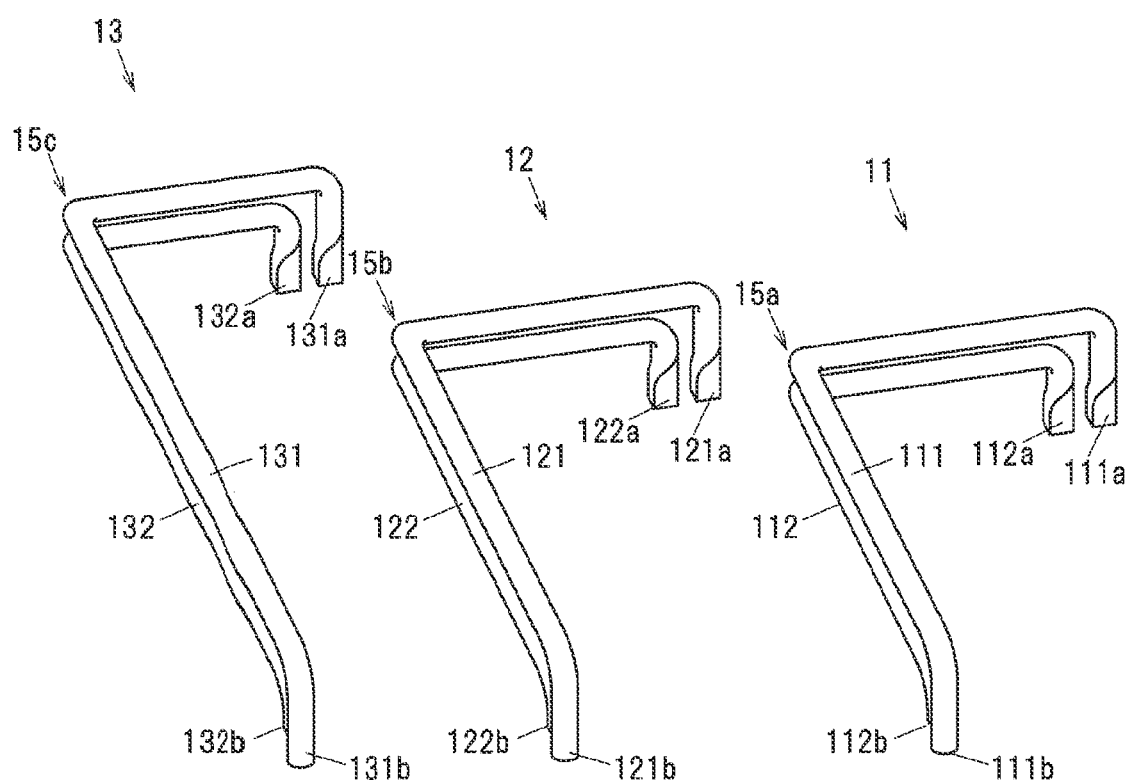
FIG. 3 is a perspective view showing a plurality of electric wires.

FIG. 3 is a perspective view showing the electric wires 111 and 112, the electric wires 121 and 122, and the electric wires 131 and 132, which are paired respectively. The electric wires 111 and 112 configure the first electric wire pair 11. The electric wires 121 and 122 configure the second electric wire pair 12. The electric wires 131 and 132 configure the third electric wire pair 13.

The electric wires 111, 112, 121, 122, 131, and 132 are respectively provided with a combining part connected to connected objects at both ends. For example, one ends 111a and 112a of the two electric wires 111 and 112 of the first electric wire pair 11 are respectively connected to the U-phase winding wire of a three phase motor. For example, one ends 121a and 122a of the two electric wires 121 and 122 of the second electric wire pair 12 are respectively connected to the V-phase winding wire of the three phase motor. For example, one ends 131a and 132a of the two electric wires 131 and 132 of the third electric wire pair 11 are respectively connected to the W-phase winding wire of the three phase motor. For example, connecting terminals fixed on a terminal block are respectively crimped to the other ends 111b and 112b of the two electric wires 111 and 112 of the first electric wire pair 11. For example, connecting terminals fixed on a terminal block are respectively crimped to the other ends 121b and 122b of the two electric wires 121 and 122 of the second electric wire pair 12. For example, connecting terminals fixed on a terminal block are respectively crimped to the other ends 131b and 132b of the two electric wires 131 and 132 of the third electric wire pair 13.

(Description of the First Fixing Member 2)

The electric wires 111, 112, 121, 122, 131, and 132 are inserted into the first fixing member 2. In the embodiment, the electric wires 111, 112, 121, 122, 131, and 132 are respectively in linear at an inserting part of the first fixing member 2. As shown in FIG. 1, the first fixing member 2 has approximately rectangular shape. Shapes of the electric wires 111, 112, 121, 122, 131, and 132 viewed from an axial direction (extended direction) have rectangular shape.

As a long side direction of the rectangular shape is defined as the X direction and a short side direction of the rectangular shape is defined as the Y direction, the two electric wires 111 and 112 of the first electric wire pair 11, the two electric wires 121 and 122 of the second electric wire pair 12, and the two electric wires 131 and 132 of the third electric wire pair 13 are respectively arranged in the Y direction. One side of the electric wire 111 from the first electric wire pair 11, one side of the electric wire 121 from the second electric wire pair 12, and one side of the electric wire 131 from the third electric wire pair 13 are partially arranged in the X direction. Also, one side of the electric wire 112 from the first electric wire pair 11, one side of the electric wire 122 from the second electric wire pair 12, and one side of the electric wire 132 from the third electric wire pair 13 are partially arranged in the X direction. That is, the first electric wire pair 11, the second electric wire pair 12, and the third electric wire pair 13 are partially arranged in a crossing direction to an arrangement direction of the two electric wires (electric wires 111 and 112, electric wires 121 and 122, and electric wires 131 and 132). In such case, axial directions of the electric wires 111, 112, 121, 122, 131, and 132 are the Z direction orthogonal to the X direction and the Y direction. In the embodiment, The first fixing member 2 connects a part of the first electric wire pair 11, a part of the second electric wire pair 12, and a part of the third electric wire pair 13.

Figure 4A:
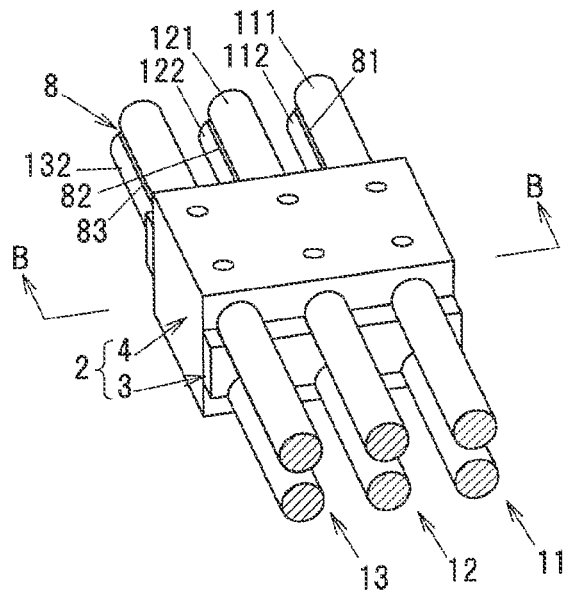
FIG. 4A is an enlarged view showing a combining part and surroundings.

FIG. 4A is an enlarged view showing the combining part 2 and surroundings. The first fixing member 2 integrally fixes the plurality of electric wire pairs 11 to 13. The first fixing member 2 is arranged at near the other ends 111b, 112b, 121b, 122b, 131b, and 132b of the plurality of electric wire pairs 11 to 13 (i.e., near a terminal block side end). That is, lengths of the electric wires 111, 112, 121, 122, 131, and 132 from the first fixing member 2 to a winding wire side ends 111a, 112a, 121a, 122a, 131a, and 132a is longer than lengths of the electric wires 111, 112, 121, 122, 131, and 132 from the first fixing member 2 to the terminal block side ends 111b, 112b, 121b, 122b, 131b, 132b.

The first fixing member 2 is provided with a holder 3 for holding an electric wire, and a resin mold part 4 formed of molding resin, which is molded so as to integrally cover a part of the electric wire pairs 11 to 13 held by the holder 3.

Figure 4B:
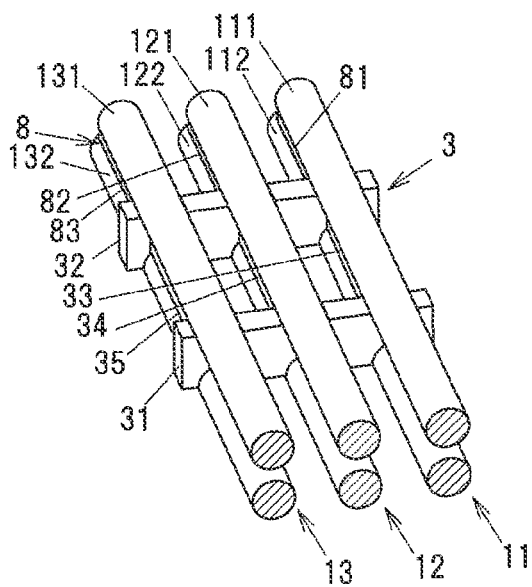
FIG. 4B is a perspective view showing state that a holder holds a part of the electric wire before molding the resin mold part.
Figure 4C:
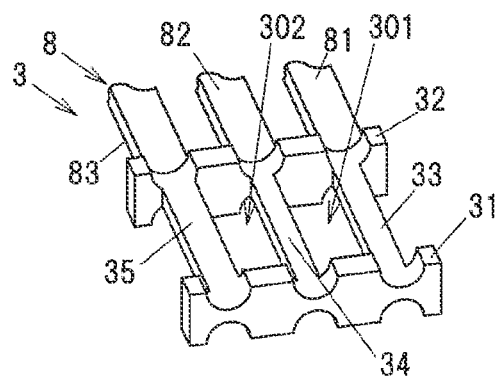
FIG. 4C is a perspective view showing a holder.
Figure 5:
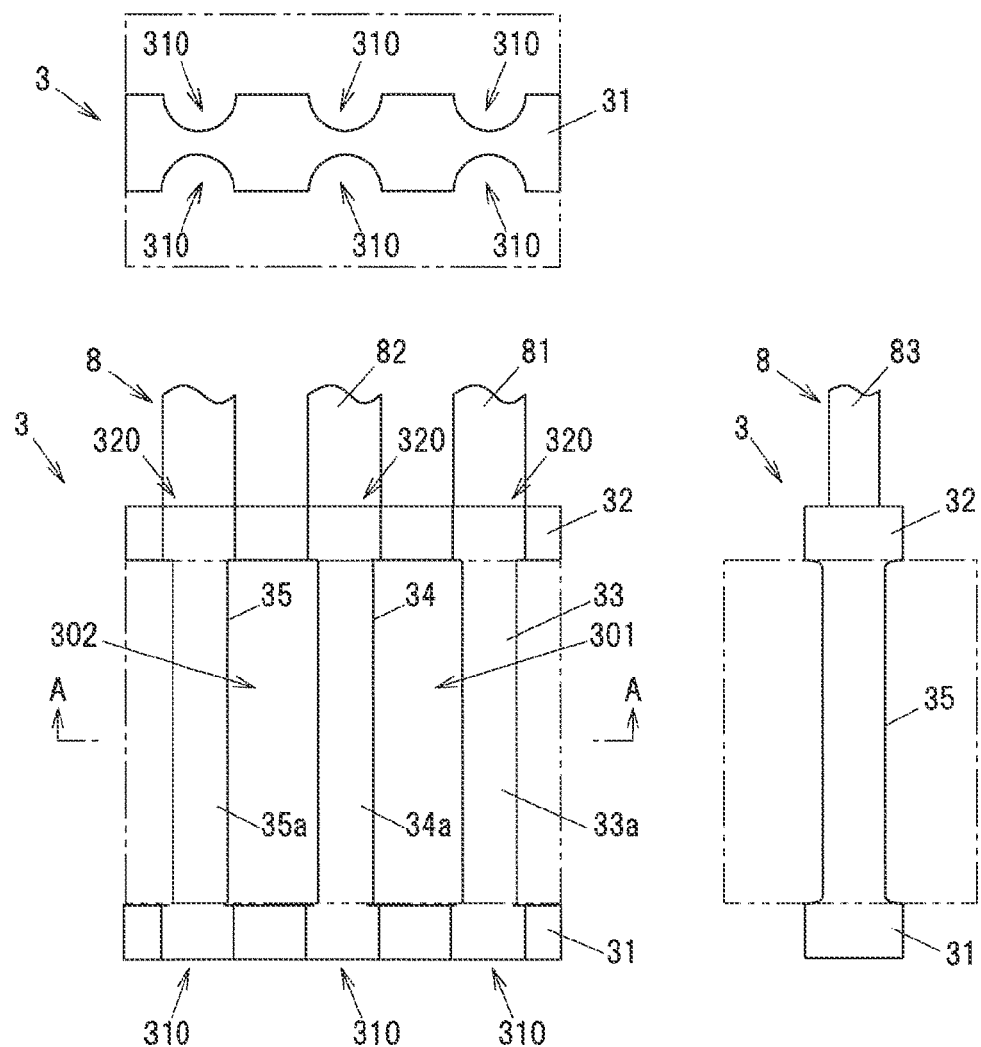
FIG. 5 is a trihedral drawing showing the holder.
Figure 6A:
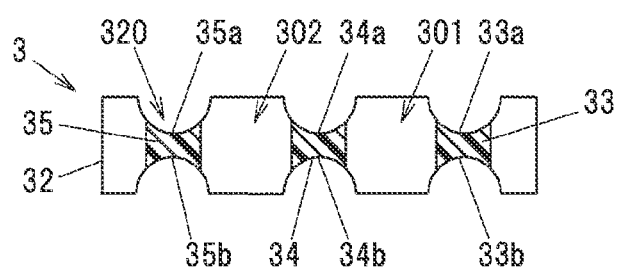
FIG. 6A is a cross sectional view of FIG. 5 cut along the line A-A.
Figure 6B:
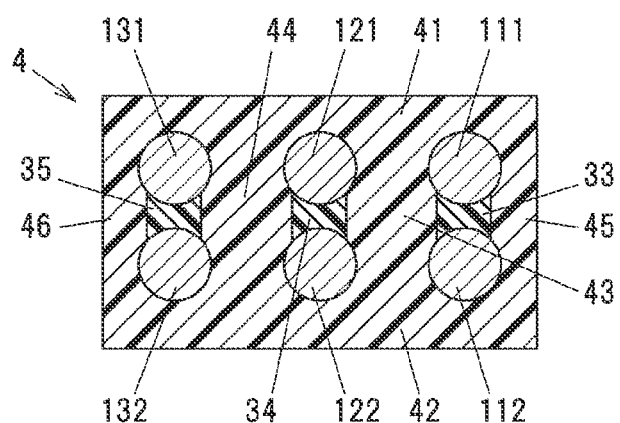
FIG. 6B is a cross sectional view of FIG. 4A cut along the line B-B.

FIG. 4B is a perspective view showing state that the holder 3 holds a part of the electric wires 111, 112, 121, 122, 131, and 132 before molding the resin mold part 4. FIG. 4C is a perspective view showing the holder 3. FIG. 5 is a trihedral drawing showing the holder 3. FIG. 6A is a cross sectional view of FIG. 5 cut along the line A-A. FIG. 6B is a cross sectional view of FIG. 4A cut along the line B-B. In FIG. 5, outline where the resin mold part 4 is formed is described by virtual line (two-dot chain line).

For example, the holder 3 is a resin member formed of resin by injection molding. The holder 3 is integrally provided with a pair of plates 31 and 32 arranged in the Z direction, and a plurality of (in the embodiment, three) interposed parts 33 to 35 provided between the pair of plates 31 and 32. The plurality of interposed parts 33 to 35 has a rod shape extended to the Z direction. The pair of plates 31 and 32 is arranged at a position sandwiching the plurality of interposed parts 33 to 35 along the axial direction of the electric wires 111, 112, 121, 122, 131, and 132 covered with the resin mold part 4. The pair of plates 31 and 32 is respectively formed from one plate formed along a crossing direction (X direction) to the axial direction of the electric wires 111, 112, 121, 122, 131, and 132.

In the below description, one ends 111a, 112a, 121a, 122a, 131a, and 132a of the electric wires 111, 112, 121, 122, 131, and 132 side plate 31 is set as the first plate 31. And the other end 111b, 112b, 121b, 122b, 131b, and 132b of the electric wires 111, 112, 121, 122, 131, and 132 side plate 32 is set as the second plate 32. An interposed part 33 corresponding to the first electric wire pair 11 is set as the first interposed part 33, an interposed part 34 corresponding to the second electric wire pair 12 is set as the second interposed part 34, and an interposed part 35 corresponding to the third electric wire pair 13 is set as the third interposed part 35.

The first interposed part 33 is interposed between the two electric wires 111 and 112 of the first electric wire pair 11. The second interposed part 34 is interposed between the two electric wires 121 and 122 of the second electric wire pair 12. The third interposed part 35 is interposed between the two electric wires 131 and 132 of the third electric wire pair 13. The resin mold part 4 covers entire in the longitudinal direction (Z direction) of the first to third interposed parts 33 to 35. That is, the first to third interposed parts 33 to 35 are provided on an entire covered part in the first fixing member 2 with the resin mold part 4. The first plate 31 and the second plate 32 are located at an outside of the resin mold part 4.

Facing surfaces 33a and 33b to the electric wires 111 and 112 of the first interposed part 33, facing surfaces 34a and 34b to the electric wires 121 and 122 of the second interposed part 34, and facing surfaces 35a and 35b to the electric wires 131 and 132 of the third interposed part 35 are respectively curved surfaces having curvatures corresponding to an outer diameter of the electric wires 111, 112, 121, 122, 131, and 132. In other words, grooves having arched cross section bottom surfaces partially housing the electric wires 111, 112, 121, 122, 131, and 132 are formed along the Z direction on the first to third interposed parts 33 to 35.

As the outer diameters of the electric wires 111, 112, 121, 122, 131, and 132 are set as 2R and curvature radii of the facing surfaces 33a, 33b, 34a, 34b, 35a, and 35b of the first to third interposed parts 33 to 35 are set as r, the ratio r/R is desirable to satisfy $0.9 \leq r/R \leq 1.1$.

In the holder 3, through holes 301 and 302 are formed in an arrangement direction (Y direction) of paired electric wires (the electric wire 111 and the electric wire 112, the electric wire 121 and the electric wire 122, and the electric wire 131 and the electric wire 132) between the first to third interposed parts 33 to 35. The though hole 301 is defined between the first interposed part 33 and the second interposed part 34. The through hole 302 is defined between the second interposed part 34 and the third interposed part 35. In the embodiment, although through holes 301 and 302 are long holes defined between the first plate 31 and the second plate 32, it is not limited thereto. One or a plurality of circular holes may be defined as the through hole between the first interposed part 33 and the second interposed part 34, and between the second interposed part 34 and the third interposed part 35.

Molding resin for the resin mold part 4 is filled in the through holes 301 and 302. Thus, one side portion in the Y direction in the resin mold part 4 (surrounding portion of the electric wires 111, 121, and 131 shown by the numeral 41 in FIG. 5B) is connected to the other side portion in the Y direction in the resin mold part 4 (surrounding portion of the electric wires 112, 122, and 132 shown by the numeral 42 in FIG. 5B) by filled portion 43 and 44 in the through holes 301 and 302. In the embodiment, the one side portion in the Y direction 41 is also connected to the other side portion in the Y direction 42 in the resin mold part 4 by an opposite portion 45 of the first interposed part 34 to the second interposed part 34 and an opposite portion 46 of the third interposed part 35 to the second interposed part 34.

Six concave parts 310 for holding the electric wires 111, 112, 121, 122, 131, and 132 at one ends in the Z direction in molding the resin mold part 4 is formed at the first plate 31 of the holder 3. Also, six concave parts 320 for holding the electric wires 111, 112, 121, 122, 131, and 132 at the other ends in the Z direction in molding the resin mold part 4 is formed at the second plate 32 of the holder 3. Inner peripheral surfaces of the concave parts 310 and 320 are formed in semicircular shapes viewed from the axial direction (Z direction). The concave parts 310 and 320 house approximately half of the electric wires 111, 112, 121, 122, 131, and 132 in the circular direction when the holder 3 holds the electric wires 111, 112, 121, 122, 131, and 132.

A combining parts 8 (81 to 83) is connected to an opposite surface to the interposed parts 33 to 35 of the second plate 32. Details of the combining part 8 will be described below.

(Description of the Second Fixing Member 5)

The second fixing member 5 is provided with a holder 6 for holding an electric wire, and a resin mold part 7 formed of molding resin molded so as to cover a part of the electric wire pair held by the holder 6. The second fixing member 5 acts as increasing fixed points and preventing effect caused by vibration (load by vibration) where the electric wires 111, 112, 121, 122, 131, and 132 are relatively long.

In the embodiment, the second fixing member 5 is provided with a first sub-fixing member 51 for integrally fixing the electric wires 111, 112, 121, and 122 configuring the first electric wire pair 11 and the second electric wire pair 12, and a second sub-fixing member 51 for integrally fixing the electric wires 131 and 132 configuring the third electric wire pair 13.

The first sub-fixing member 51 is provided with a first sub-holder 61 for holding the electric wires 111, 112, 121, and 122, and a first resin mold part 71 formed of molding resin molded so as to cover a part of the electric wire pairs 11, 12 held by the first sub-holder 61.

Figure 7A:
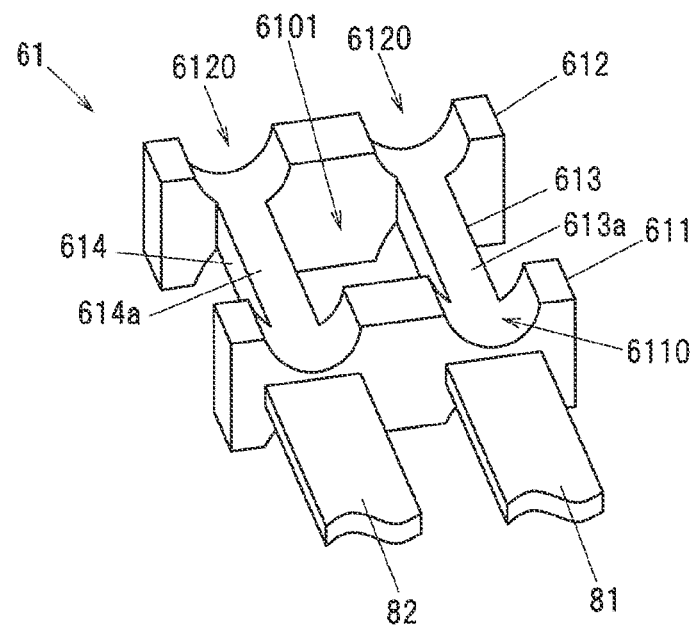
FIG. 7A is a perspective view showing a first sub-holder.

FIG. 7A is a perspective view showing the first sub-holder 61. The first sub-holder 61 is basically in same structure with the holder 3 of the first fixing member 2 shown in FIG. 4C etc. Meanwhile, a number of holding electric wires is four in the first sub-holder 4. The first sub-holder 61 is integrally provided with a pair of plates 611 and 612 opposite to the longitudinal direction (X direction) of the electric wires 111, 112, 121, and 122, and two rod shaped interposed parts 613 and 614 provided between the pair of plates 611 and 612.

Concave parts 6110, 6120 for housing and holding the electric wires 111, 112, 121, and 122 are formed on the plates 611 and 612. The interposed part 613 is provided so as to be interposed between the electric wires 111 and 112. The interposed part 614 is provided so as to be interposed between the electric wires 121 and 122. Facing surfaces 613a and 614a of the interposed parts 613 and 614 to the electric wires 111 and 121 are respectively formed on curved surfaces having curvatures corresponding to outer diameters of the electric wires 111 and 121. Also, facing surfaces of the interposed parts 613 and 614 to the electric wires 112 and 122 are respectively formed on curved surfaces having curvatures corresponding to outer diameters of the electric wires 112 and 122. A through hole 6101 in which molding resin is filled is defined between the interposed parts 613 and 614. The first combining part 81 and the second combining part 82 as the combining part 8 are connected to an opposite surface of the plate 611 to the interposed parts 613, 614.

The second sub-fixing member 52 is provided with a second sub-holder 62 for holding the electric wires 131 and 132, and a second resin mold part 72 formed of molding resin molded so as to cover a part of the electric wire pair 13 held by the second sub-holder 62.

Figure 7B:
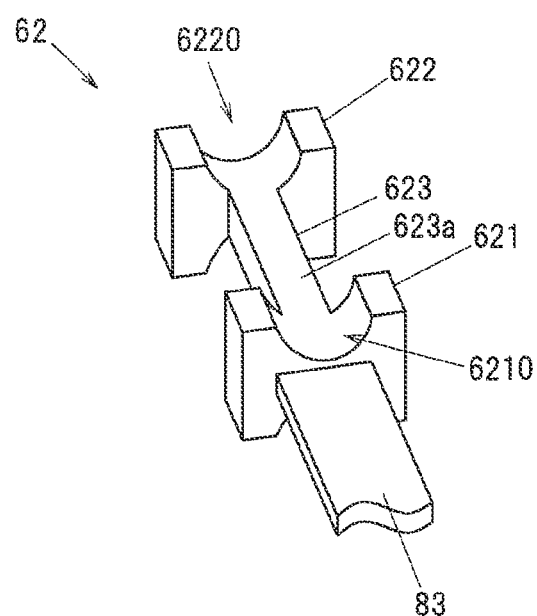
FIG. 7B is a perspective view showing a second sub-holder.

FIG. 7B is a perspective view showing the second sub-holder 62. The second sub-holder 62 is a sub-holder such that a number of holding the electric wire is two in the first sub-holder 61 in FIG. 7A. The second sub-holder 62 is integrally provided with a pair of plates 621 and 622 opposite to the longitudinal direction (X direction) of the electric wires 131 and 132, and a rod shaped interposed part 623 provided between the pair of plates 621 and 622.

Concave parts 6210 and 6220 for housing and holding the electric wires 131 and 132 are formed on the plates 621 and 622. The interposed part 623 is provided so as to be interposed between the electric wires 131 and 132. A facing surface 623a of the interposed part 623 to the electric wire 131 is formed on a curved surface having a curvature corresponding to an outer diameter of the electric wire 131. Also, a facing surface of the interposed part 623 to the electric wire 132 is formed on a curved surface having a curvature corresponding to an outer diameter of the electric wire 132. The third combining part 83 as the combining part 8 is connected to an opposite surface of the plate 621 to the interposed part 623.

(Description of the Combining Part 8)

The distribution member 1 according to the embodiment is integrally provided with the holder 3 of the first fixing member 2 and the holder 6 of the second fixing member 5 (sub-holders 61 and 62). The distribution member 1 is provided with the combining part 8 for connecting the holders 3 of the first fixing member 2 with the second fixing member 5. The combining part 8 is a member doubling as connecting both holders 3 and 6 and decreasing a number of parts, and helping manufacturing easily by helping arranging the holders 3 and 6 to the mold, and interposing between the paired electric wires and ensuring insulating distance.

Figure 8:
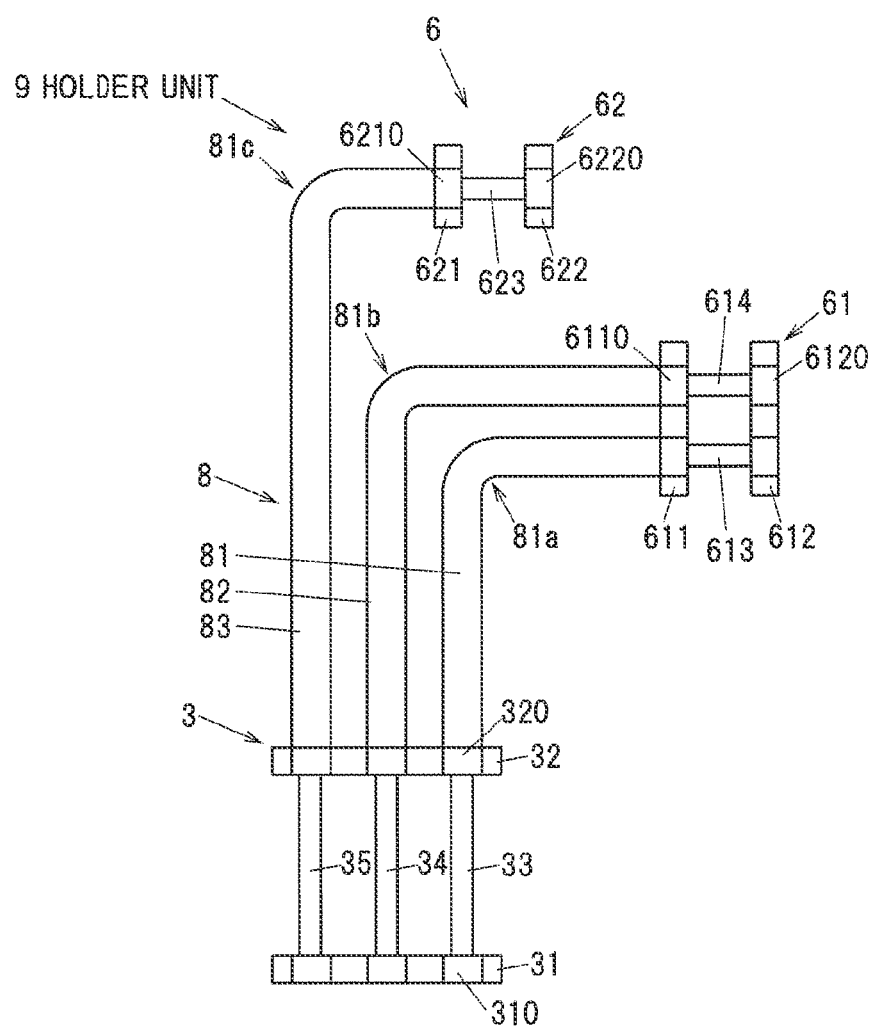
FIG. 8 is a plan view showing a holder unit.

FIG. 8 is a plan view showing a holder unit 9 connecting the holder 3, and the sub-holders 61 and 62 by the combining part 8. The combining part 8 is provided with a first combining part 81 corresponding to the first electric wire pair 11, a second combining part 82 corresponding to the second electric wire pair 12, and a third combining part 83 corresponding to the third electric wire pair 13. The first combining part 81 is formed along the electric wires 111 and 112, and arranged so as to interpose between the electric wires 111 and 112. The second combining part 82 is formed along the electric wires 121 and 122, and arranged so as to interpose between the electric wires 121 and 122. The third combining part 83 is formed along the electric wires 131 and 132, and arranged so as to interpose between the electric wires 131 and 132. Each combining part 81 to 83 is formed in a strip. A cross section orthogonal to the longitudinal direction of each combining part 81 to 83 is formed in a rectangular shape.

The holder 3 and the first sub-holder 61 are connected each other through the first combining part 81 and the second combining part 82. The holder 3 and the second sub-holder 62 are connected each other through the third combining part 83. For example, the combining parts 81 to 83 are formed by injection molding with the holder 3 and the sub-holders 61 and 62.

As the combining parts 81 to 83 is wider, insulating distance between the electric wires 111 and 112, the electric wires 121 and 122, or the electric wires 131 and 132, which configure the electric wire pairs 11 to 13 (spatial distance and surface distance along the surfaces of the holder 3 and the sub-holders 61 and 62) can be increased. Meanwhile, as the combining parts 81 to 83 project laterally from the electric wires 111, 112, 121, 122, 131, and 132, it is hard to arrange the distribution member 1 in a narrow space, and it is hard to fix clip etc., for fixing the distribution member 1 on a surrounding member. Although it is considered to arrange a positioning protrusion such as a pin for fixing the distribution member so as to position the distribution member 1, it is hard to position the distribution member by using such positioning protrusion where the combining parts 81 to 83 project laterally from the electric wires 111, 112, 121, 122, 131, and 132. Thus, widths of the combining parts 81 to 83 are desirable to be not more than the outer diameters of the electric wires 111, 112, 121, 122, 131, and 132, and the combining parts 81 to 83 are desirable not to project laterally from the electric wires 111, 112, 121, 122, 131, and 132.

As the widths of the combining parts 81 to 83 are too narrow, effect to increase the insulating distance may not be obtained sufficiently. Thus, the widths of the combining parts 81 to 83 are desirable to be at least not less than 50% of the outer diameters of the electric wires 111, 112, 121,

122, 131, and 132. To ensure the surface distance, only a part of the combining parts 81 to 83 near the holders 3 and 6 can be formed widely and the other part of the combining parts 81 to 83 can be formed relatively narrowly.

In the embodiment, bending parts 15 are respectively formed in the electric wire pairs 11 to 13, and the first fixing member 2 and the second fixing member 5 are arranged with separated through the bending part 15. The first electric wire pair 11 is bent at a first bending part 15a at approximately 90°. The second electric wire pair 12 is bent at a second bending part 15b at approximately 90°. The third electric wire pair 13 is bent at a third bending part 15c at approximately 90°.

Thus, the longitudinal directions of the electric wires 111, 112, 121, 122, 131, and 132 at a position where the first fixing member 2 is arranged is approximately orthogonal to the longitudinal directions of the electric wires 111, 112, 121, and 122, at a position where the first sub-fixing member 51 is arranged. Also, the longitudinal directions of the electric wires 111, 112, 121, 122, 131, and 132 at a position where the first fixing member 2 is arranged is approximately orthogonal to the longitudinal directions of the electric wires 131 and 132, at a position where the second sub-fixing member 52 is arranged. As an electric wire longitudinal direction at the position where the first fixing member 2 is arranged is in same with an electric wire longitudinal direction at the position where the second fixing member 5 is arranged, the first fixing member 2 and the second fixing member 5 may move together and positional gaps may be caused where external force is loaded. On the other hand, in the embodiment, since the first fixing member 2 and the second fixing member 5 are arranged with separated through the bending part 15, the electric wire longitudinal direction at the position where the first fixing member 2 is arranged is different from the electric wire longitudinal direction at the position where the second fixing member 5 is arranged. Thus, causing positional gaps at the position where the first fixing member 2 and the second fixing member 5 are arranged when the external force is loaded can be prevented. To surely prevent causing the positional gaps of the first fixing member 2 and the second fixing member 5, angle between the electric wire longitudinal direction at the position where the first fixing member 2 is arranged and the electric wire longitudinal direction at the position where the second fixing member 5 is arranged (i.e., an bending angle at the bending part 15) is desirable to be not less than 30°.

To prevent causing the positional gaps of the first fixing member 2 and the second fixing member 5, the combining part 8 may be formed so as to short the bending part 15. Meanwhile, as described above, the combining part 8 is desirable to be formed along the bending part 15 since the combining part 8 has a function to interpose between the electric wire pairs 11 to 13 and increase the insulating distance. In the embodiment, the first combining part 81 is provided with a first circular arc part 81a bent in an arc shape along the first bending part 15a, the second combining part 82 is provided with a second circular arc part 82a bent in an arc shape along the second bending part 15b, and the third combining part 83 is provided with a third circular arc part 83a bent in an arc shape along the third bending part 15c.

For example, the distribution member 1 is used as a current path between a driving motor in vehicle and an inverter. Since the distribution member 1 is arranged at near a heated motor, it is desirable to use resin having enough heat resistance as the resin used for the holder unit 9. Furthermore, it is desirable to use resin having enough mechanical strength that may withstand vibration as the resin used for the holder unit 9. As such resin, e.g., Poly Phenylene Sulfide (PPS) including glass fiber can be used. The same resin used for the holder unit 9 may be used as the resin used for the resin mold parts 4 and 7.

(Method of Manufacturing the Distribution Member 1)

A method of manufacturing the distribution member 1 is provided with a preparation processing for preparing the hold unit 9, an arrangement processing for arranging the holder unit 9 and each electric wire pair 11 to 13 in a mold (mold 55 described below), and a mold processing for molding the resin mold part 4, 71, and 72 by injecting melted molding resin into the mold.

In the preparation processing, the holder unit 9 is prepared. Here, preparation means to obtain the holder unit 9 used for manufacturing the distribution member 1. The preparation includes various actions to obtain the holder unit 9 such as manufacturing the holder unit 9 by injection molding.

Figure 9A:
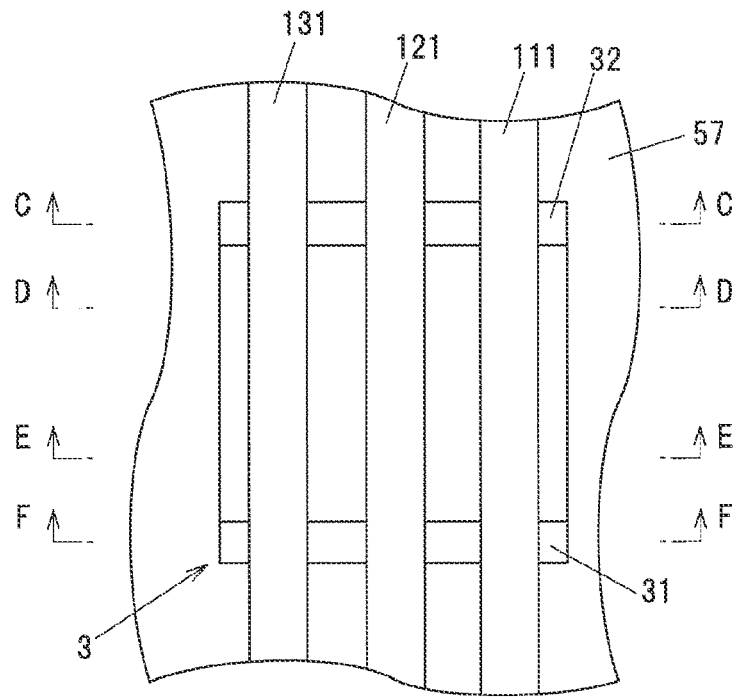
FIG. 9A is a plan view showing a holder and a part of electric wire arranged on a lower mold.
Figure 9B:
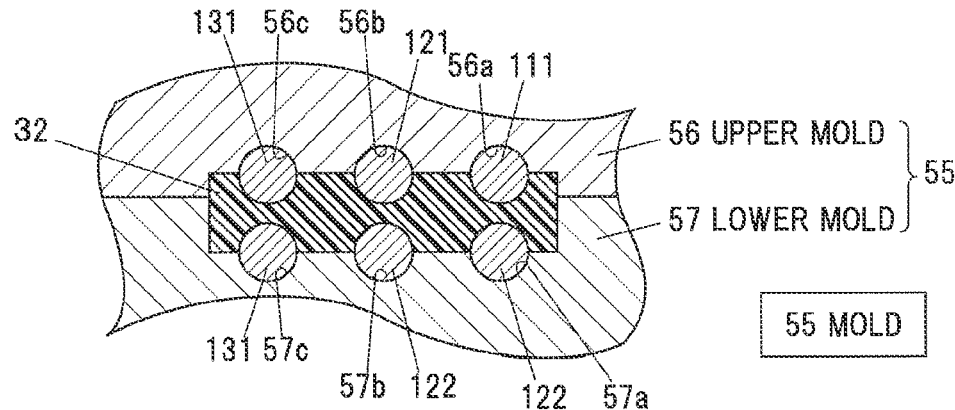
FIG. 9B is a cross sectional view showing the holder and a part of the electric wire arranged between an upper mold and the lower mold cut along the line C-C in FIG. 9A.
Figure 9C:
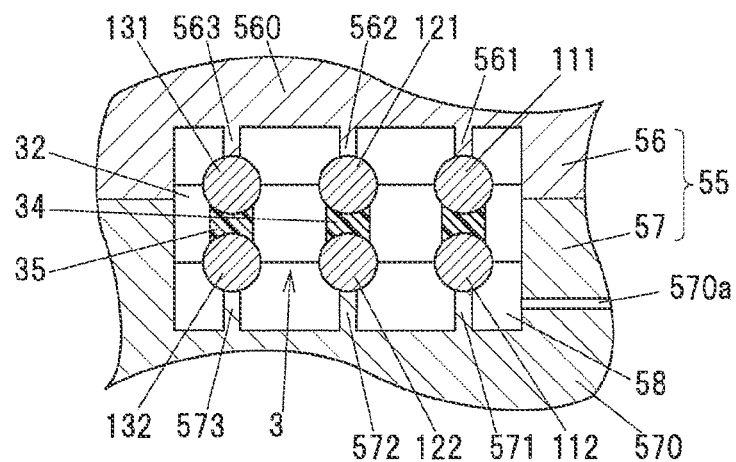
FIG. 9C is a cross sectional view showing the holder and a part of the electric wire arranged between the upper mold and the lower mold cut along the line D-D in FIG. 9A.

FIG. 9A is a plan view showing the holder 3 and a part of the electric wires 111, 112, 121, 122, 131, and 132 arranged on a lower mold 57 with omitting an upper mold 56 from the mold 55 provided with the upper mold 56 and the lower mold 57. FIG. 9B is a cross sectional view showing the holder 3 and a part of the electric wires 111, 112, 121, 122, 131, and 132 arranged between the upper mold 56 and the lower mold 57 cut along the line C-C in FIG. 9A. FIG. 9C is a cross sectional view showing the holder 3 and a part of the electric wires 111, 112, 121, 122, 131, and 132 arranged between the upper mold 56 and the lower mold 57 cut along the line D-D in FIG. 9A. The cross section in FIG. 9A cut along the line E-E is as with the cross section shown in FIG. 9C cut along the line D-D. The cross section cut along the line F-F in FIG. 9 A is as with the cross section shown in FIG. 9B cut along the line C-C.

In the arrangement processing, the holder unit 9 is arranged in the mold (mold 55 described below) such that the first to third interposed parts 33 to 35 are interposed between the paired electric wires (the electric wire 111 and the electric wire 112, the electric wire 121 and the electric wire 122, and the electric wire 131 and the electric wire 132) at the first fixing member 2, the interposed parts 613, 614 are interposed between the paired electric wires (the electric wire 111 and the electric wire 112, and the electric wire 121 and the electric wire 122) at the first sub-fixing member 51, and the interposed part 623 is interposed between the paired electric wires (the electric wire 131 and the electric wire 132) at the second sub-fixing member 52. Although specific step in arranging is not limited thereto, e.g., the arrangement processing can be performed by arranging the electric wires 112, 122, and 132 on the lower mold 57 so as to house a part of the electric wires 112, 122, and 132 in concave grooves 57a, 57b, and 57c, arranging the holder unit 9 on the part of the electric wires 112, 122, and 132, and arranging the electric wires 111, 121, and 131 on the holder unit 9.

FIGS. 9A to 9C shows a shape of a part of the mold 55 where the resin mold part 4 (first fixing member 2) is molded. The shape of parts of the mold 55 where the first resin mold part 71 is formed in the first sub-fixing member 51 and where the second resin mold part 72 is formed in the second sub-fixing member 72 is in same with the mold 55 shown in FIGS. 9A to 9C. Thus, the description will be omitted.

As shown in FIGS. 9A to 9C, concave grooves 56a, 56b, and 56c in which a part of the electric wires 111, 121, and 131 is housed is formed in the upper mold 6, and the concave grooves 56a, 56b, and 56c of the upper mold 56 respectively face the concave grooves 57a, 57b, and 57c of the lower mold 57 with sandwiching the first to third electric wire pairs 11 to 13 and the holder 3 where the upper mold 56 faces the lower mold 57.

The lower mold 57 is provided with a main body 570, and pins 571, 572, and 573 that respectively press the electric wires 112, 122, and 132 on the first to third interposed parts 33 to 35 of the holder 3. The upper mold 56 is provided with a main body 560, and pins 561, 562, and 563 that respectively press the electric wires 111, 121, and 131 on the first to third interposed parts 33 to 35 of the holder 3. A cavity 58 in which molding resin melted in the mold processing is injected is formed between the main body 570 of the lower mold 57 and the main body 560 of the upper mold 56.

Meanwhile, the pins 571 to 573 of the lower mold 57 and the pins 561 to 563 of the upper mold 56 may be omitted. Moreover, the pins 571 to 573 and the pins 561 to 563 may be configured to be movable and such that the pins 571 to 573 are housed in the main body 570 of the lower mold 57 and the pins 561 to 563 are housed in the main body 560 of the upper mold 56 after finishing the arrangement processing, and before or during performing the mold processing.

In the mold processing, the first fixing member 2 and the second fixing member 5 (first sub-fixing member 51 and second sub-fixing member 52) are configured by injecting the melted molding resin in the mold 55 and molding the resin mold parts 4, 71, and 72 so as to cover a part of the electric wires 111, 112, 121, 122, 131, and 132 held by the holder 3 and the sub-holders 61 and 62. In the example shown in FIG. 9C, the molding resin melted by heating is injected into the cavity 58 of the mold 55 from an insertion hole 570a provided in the main body 570 of the lower mold 57. In such case, the molding resin is filled into the through holes 301 and 302 of the holder 3. The molding resin forms the resin mold part 4 by covering a conductive part 10 in the cavity 58 and solidifying. Thus, the first fixing member 2 is formed. The first and second plates 31 and 32 of the holder 3 acts as a sidewall preventing the molding resin injected in the cavity 58 from leaking. As with the first fixing member 2, the first sub-fixing member 51 and the second sub-fixing member 52 are formed.

After forming the resin mold parts 4, 71, and 72 by solidifying the molding resin, the upper mold 56 is removed from the lower mold 57. And the formed first fixing member 2 and the formed second fixing member 5 (first sub-fixing member 51 and second sub-fixing member 52) are removed with the conductive part 10 from the lower mold 57. Therefore, the distribution member 1 is obtained.

Effects of the Embodiment

According to the above-described embodiment, the effect described below is obtained.

Figure 12A:
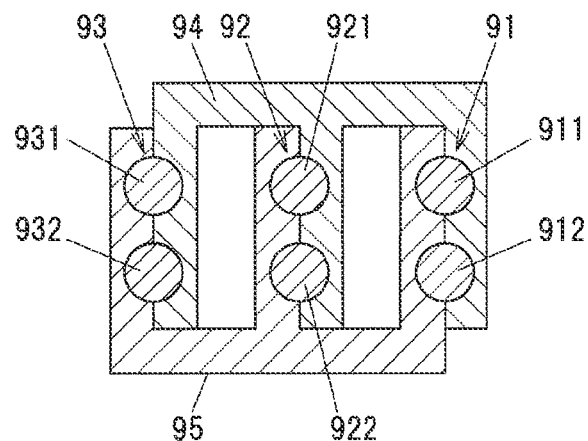
FIG. 12A is an explanatory drawing showing a comparative constructive example of a sliding mold for forming a combining part by molding.
Figure 12B:
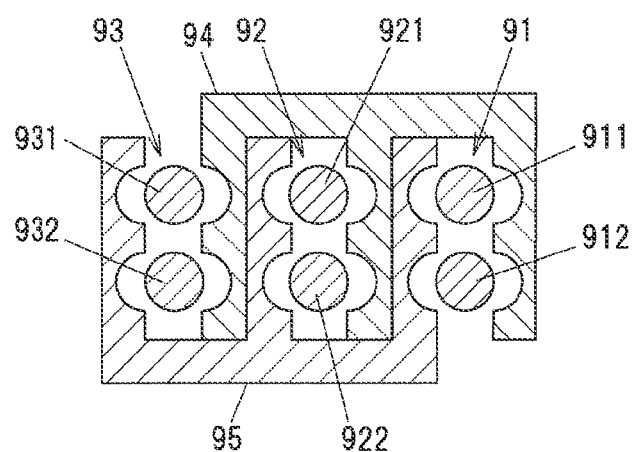
FIG. 12B is an explanatory drawing showing a comparative constructive example of the sliding mold for forming the combining part by molding.

(1) As described with reference to FIG. 12, since it is unnecessary to make a space for moving a sliding mold between a plurality of electric wire pairs, it is possible to downsize by narrowing space between the first to third electric wire pairs 11 to 13 while forming the first fixing member 2 integrally connecting the first to third electric wire pairs 11 to 13, and the second fixing member 5 by molding.

(2) For the distribution member 1 of which the electric wires 111, 112, 121, 122, 131, and 132 are relatively long, fixing the electric wires 111, 112, 121, 122, 131, and 132 at a plurality of positions in the longitudinal direction of the electric wire pairs 11 to 13 so as to prevent effect by vibration is desired. To combine such desire and downsizing described in above (1), it is necessary to arrange the holder 3, 6 at each fixing position (each fixing member 2, 5). However, a number of parts increase and it takes time to manufacture since a plurality of holders 3, 6 is necessary to be arranged in the mold 55 in manufacturing. For the distribution member 1 according to the embodiment, since the combining part 8 connects the holder 3 of the first fixing member 2 with the holder 6 of the second fixing member 5, the number of parts can be reduced even if the electric wire pairs 11 to 13 are fixed at a plurality of positions. Arrangement of the holders 3 and 6 on the mold 55 can be facilitated by configuring the holder unit 9 by connecting the holders 3 and 6 each other. Also, manufacturing can be facilitated.

(3) By arranging the combining part 8 between a pair of each electric wire pairs 11 to 13, the insulating distance between the pair can be increased.

(4) By arranging the first fixing member 2 and the second fixing member 5 with separated through the bending part 15, causing the positional gaps of the first fixing member 2 and the second fixing member 5 can be prevented. Thus, when the molding resin is reduced so as to downsize and save weight, moving the first fixing member 2 and the second fixing member 5 along the electric wire longitudinal direction by vibration can be prevented. It contributes to downsize and save weight for entire the distribution member 1.

(5) By setting the width of the combining part 8 at not more than the outer diameters of the electric wires 111, 112, 121, 122, 131, and 132, the combining parts 81 to 83 fail to project laterally from the electric wires 111, 112, 121, 122, 131, and 132. It is easy to arrange the distribution member 1 at a narrow space. Also, it is easy to fix a clip etc., for fixing the distribution member 1 to a surrounding member. It is possible to position the distribution member 1 easily by positioning protrusions such as a pin.

(6) Since the interposed parts 33 to 35, 613, 614, and 623 are provided on entire part covered with the resin mold part 4, 71, and 72, forming a space in which the molding resin is not filled between the electric wires 111 and 112 in the first electric wire pair 11, the electric wires 121 and 122 in the second electric wire pair 12, and the electric wires 131 and 132 in the third electric wire pair 13 can be prevented.

(7) Since facing surfaces in the interposed parts 33 to 35, 613, 614, and 623 to the electric wires 111, 112, 121, 122, 131, and 132 are respectively curved surfaces having curvatures corresponding to the outer diameters of the electric wires 111, 112, 121, 122, 131, and 132, forming the space in which the molding resin is not filled can be surely prevented. Also, causing the positional gaps of the electric wires 111, 112, 121, 122, 131, and 132 in the mold processing to the holders 3 and 6 can be prevented.

(8) Since the molding resin of the resin mold parts 4 and 71 is filled in the through holes 301 and 302 defined in the holder 3, and the through hole 6101 defined in the first sub-holder 61, separating the resin mold parts 4 and 71 from the holder 3 and the first sub-holder 61 can be prevented. Thus, strength of the first fixing member 2 and the first sub-fixing member 51 can be increased.

(Variations)

In the above-described embodiment, although the combining parts 81 to 83 are provided individually so as to respectively correspond to each electric wire pair 11 to 13, the combining parts 81 to 83 may be partially or integrally connected and incorporated. For example, as with a holder unit 9a shown in FIG. 10A, the holder unit 9a may be provided with a plate shaped fourth combining part 84 that incorporates the first combining part 81 and the second combining part 82. As with a holder unit 9b shown in FIG. 10B, the holder unit 9b may be configured to form a plate shaped fifth combining part 85 that incorporates the third combining part 83 and a holder 3 side end of the fourth combining part 84 and to be divided with the third combining part 83 and the fourth combining part 84 at an opposite side end of the fifth combining part to the holder 3.

In the above-described embodiment, although connecting two second fixing members 5 in parallel to the first fixing member 2 has been described, a number of the second fixing member 5 may be one, or not less than three. Two or more second fixing members 2 may be connected in series to the first fixing member 2. In such case, the holder unit 9 that connects the holders 6 of the second fixing members 5 connected in series at the combining part 8 may be used.

Figure 11A:
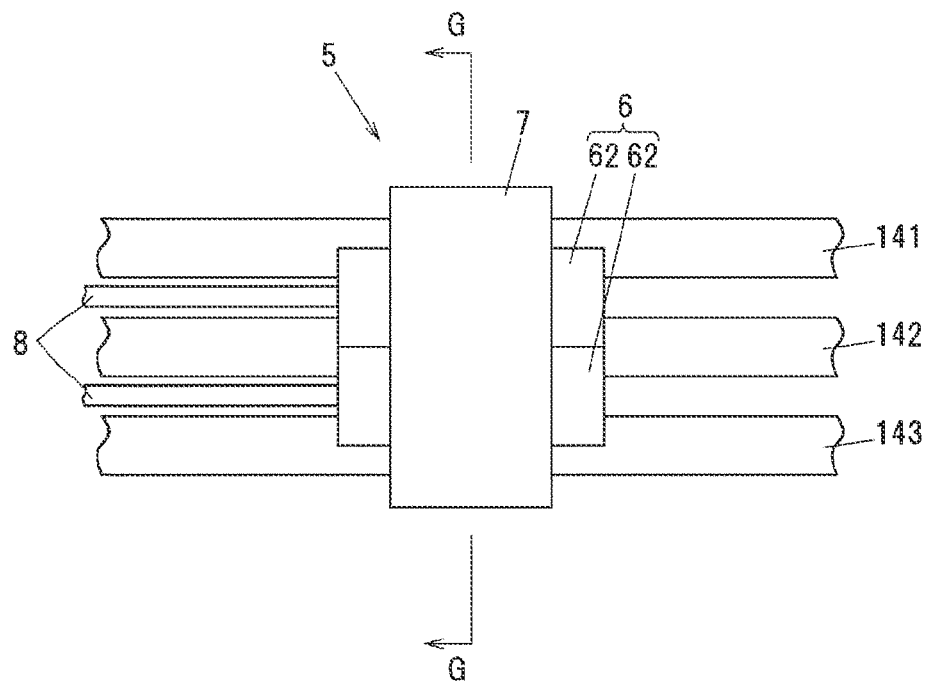
FIG. 11A is a side view showing a distribution member according to the variation in the invention.
Figure 11B:
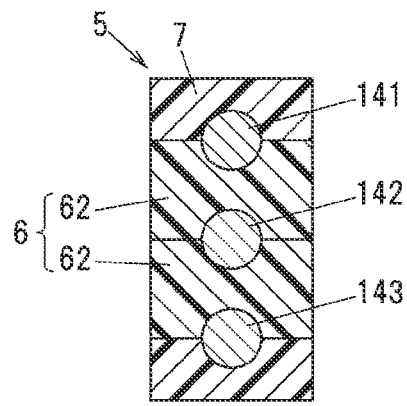
FIG. 11B is a cross sectional view showing a distribution member according to the variation in the invention cut along the line G-G.

In the above-described embodiment, although using single holders 3 and 6 for the single fixing members 2 and 5 has been described, two or more holders 3 and 6 may be used for the single fixing members 2 and 5. For example, as shown in FIGS. 11A and 11B, where three electric wires 141 to 143 are arranged in parallel, the second fixing member 5 may be formed by arranging the second sub-holder 62 as the holder 6 between the electric wires 141 and 142, arranging the other second sub-holder 62 between the electric wires 142 and 143, and providing the resin mold part 7 so as to integrally covers two second sub-holder 62 and the electric wires 141 to 143. Although the second fixing member 5 is described in FIG. 11, it is as with the first fixing member 2.

SUMMARY OF THE EMBODIMENTS

Next, technical ideas understood from the embodiment will be described below reciting the reference numerals etc. used in the above embodiment. However, each reference numeral etc. described below is not intended to limit the constituent elements of attached claims to the members etc. specifically described in the embodiment.

[1] A distribution member (1), comprising:
a plurality of electric wire pairs (11 to 13) each comprising a pair of electric wires (111, 112, 121, 122, 131, and 132);
a first fixing member (2) integrally fixing the plurality of electric wire pairs (11 to 13); and
a second fixing member (5) that is separated from the first fixing member (2) and integrally fixes electric wires (111, 112, 121, 122, 131 and 132) of at least one electric wire pair (11 to 13) of the plurality of electric wire pairs (11 to 13),
wherein the first fixing member (2) and the second fixing member (5) each comprise a holder (3, 6) holding the electric wires (111, 112, 121, 122, 131 and 132) and a resin mold part (4, 7) that comprises a molding resin and is molded so as to cover a part of the electric wire pairs (11 to 13) held by the holder (3, 6),
wherein the holder (3, 6) comprises at least one interposed part (33 to 35, 613, 614 and 623) that is interposed between the held electric wires (111, 112, 121, 122, 131 and 132), and
wherein the distribution member (1) further comprises a combining part (8) that is integrally formed with the holder (3) of the first fixing member (2) and the holder (6) of the second fixing member (5) and combines the holder (3) of the first fixing member (2) and the holder (6) of the second fixing member (5).

[2] The distribution member (1) according to [1], wherein the combining part (8) is arranged between the pair of electric wires (111, 112, 121, 122, 131, 132).

[3] The distribution member (1) according to [1] or [2], wherein a bending part (15) is formed in the electric wire pairs (11 to 13), and
wherein the first fixing member (2) is separated from the second fixing member (5) via the bending part (15).

[4] The distribution member (1) according to [3], wherein the combining part (8) is formed along the bending part (15).

[5] The distribution member (1) according to any one of [1] to [4], wherein a width of the combining part (8) is not more than an outer diameter of the electric wires (111, 112, 121, 122, 131, and 132).

[6] The distribution member (1) according to any one of [1] to [5], wherein a plurality of interposed parts (33 to 35) is provided over an entirety of the part covered by the resin mold part (4).

[7] The distribution member (1) according to [6], wherein the holder (3, 6) further comprises a pair of plates (31, 32) that sandwiches the plurality of interposed parts (33 to 35) along an axial direction of a part of the electric wires (111, 112, 121, 122, 131 and 132) of the part covered by the resin mold part (4).

[8] The distribution member (1) according to any one of [1] to [7], wherein a facing surface (33a, 33b, 34a, 34b, 35a, 35b, 613a, 614a and 623a) of the interposed part (33 to 35, 613, 614, and 623) to the electric wires (111, 112, 121, 122, 131 and 132) comprise a curved surface having a curvature corresponding to an outer diameter of the electric wires (111, 112, 121, 122, 131 and 132).

[9] The distribution member (1) according to any one of [1] to [8], wherein a through hole (301, 302, 6101) in an arrangement direction of the paired electric wires (111a nd 112, 121 and 122, and 131 and 132) is defined between the plurality of interposed parts (33 to 35, 613 and 614) of the holder, and
wherein a molding resin for the resin mold part (4, 7) is filled in the through hole (301, 302 and 6101).

[10] A method of manufacturing a distribution member (1) that comprises a plurality of electric wire pairs (11 to 13) each comprising a pair of electric wires (111, 112, 121, 122, 131 and 132), a first fixing member (2) for integrally fixing the plurality of electric wire pairs (11 to 13), and a second fixing member (5) that is separated from the first fixing member (2) and integrally fixes electric wires (111, 112, 121, 122, 131, and 132) of at least one electric wire pair (11 to 13) of the plurality of electric wire pairs, the method comprising:
providing a holder unit (9) comprising holders (3, 6) of the first fixing member (2) and the second fixing member (5) that hold the electric wire (111, 112, 121, 122, 131, and 132) and comprise one or more interposed parts (33 to 35, 613, 614, and 623) that are respectively interposed between the held electric wires (111, 112, 121, 122, 131 and 132) and a combining part (8) that combines the holders (3, 6) of the first fixing member (2) and the second fixing member (5) and is integrally formed with the holder (3, 6) of the first fixing member (2) and of the second fixing member (5);
arranging the holder unit (9) in a mold (55) such that a plurality of the interposed parts (33 to 35, 613, 614 and 623) are interposed between the electric wires (111, 112, 121, 122, 131, 132); and
forming the first fixing member (2) and the second fixing member (5) such that a resin mold part (4, 7) is molded so as to cover a part of the electric wire pairs (11 to 13) held by the holders (3, 6) by injecting a melted molding resin into the mold (55).

[11] The method according to [10], wherein a through hole (301, 302 and 6101) in an arrangement direction of the paired electric wires (111 and 112, 121 and 122, 131 and 132) is defined in the holders (3, 6) between the plurality of interposed parts (33 to 35, 613, and 614), and
wherein the molding resin is filled in the through hole (301, 302, 6101) in the forming of the first and second fixing members.

Although the embodiments of the invention have been described, the invention according to claims is not to be limited to the above-mentioned embodiment. It should be noted that all combinations of the features described in the embodiments are not necessary to solve the problem of the invention.

Further, the invention can be appropriately modified and implemented without departing from the gist thereof. For example, in the above-described embodiment, although the case that the electric wires 111, 112, 121, 122, 131, and 132 are enameled wires has been described, it is not limited thereto. The electric wires 111, 112, 121, 122, 131, and 132 may be composed of insulated wires of which conductive wires formed of good conductive metals such as copper are coated by an insulator. In such case, the insulator is removed and the conductive wire is exposed at both ends of each electric wire 111, 112, 121, 122, 131, and 132.

What is claimed is:

1. A wiring structure, comprising:
   two electric wires;
   a first holder comprising a first interposed part being provided between the two electric wires;
   a second holder comprising a second interposed part being separated from the first holder and provided between the two electric wires; and
   a combining part connecting between the first holder and the second holder and being located between the two electric wires,
   wherein the first holder, the second holder, and the combining part are provided integrally, and
   wherein the two electric wires in the first holder are covered with a first resin mold part comprising a molding resin and the two electric wires in the second holder are covered with a second resin mold part being separated from the first resin mold part and comprising a molding resin, while the two electric wires in the combining part are not covered with a molding resin.

2. The wiring structure according to claim 1, wherein the first interposed part is provided over an entirety of a part covered by the first resin mold part.

3. The wiring structure according to claim 1, wherein the second interposed part is provided over an entirety of a part covered by the second resin mold part.

4. The wiring structure according to claim 1, wherein a through hole in an arrangement direction of the two electric wires is defined between the first interposed parts of the first holder, and
   wherein the molding resin of the first resin mold part is filled in the through hole.

5. The wiring structure according to claim 1, wherein a through hole in an arrangement direction of the two electric wires is defined between the second interposed part of the second holder, and
   wherein the molding resin of the second resin mold part is filled in the through hole.

6. A wiring structure, comprising:
   two electric wires;
   a first holder comprising a first interposed part being provided between the two electric wires;
   a second holder comprising a second interposed part being separated from the first holder and provided between the two electric wires; and
   a combining part connecting between the first holder and the second holder and being located between the two electric wires,
   wherein the first holder, the second holder, and the combining part are provided integrally,
   wherein the width of the combining part is at least not less than 50% of the outer diameter of the electric wires, and
   wherein a width of the combining part is not more than an outer diameter of the electric wires.

\* \* \* \* \*